(12) United States Patent
Jorgovanovic

(10) Patent No.: US 9,996,316 B2
(45) Date of Patent: Jun. 12, 2018

(54) MEDIATION OF WAKEWORD RESPONSE FOR MULTIPLE DEVICES

(71) Applicant: Amazon Technologies, Inc., Seattle, WA (US)

(72) Inventor: Milos Jorgovanovic, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 218 days.

(21) Appl. No.: 14/868,170

(22) Filed: Sep. 28, 2015

(65) Prior Publication Data
US 2017/0090864 A1   Mar. 30, 2017

(51) Int. Cl.
| G10L 15/22 | (2006.01) |
| G06F 3/16 | (2006.01) |
| G10L 21/0332 | (2013.01) |
| G10L 25/60 | (2013.01) |
| G10L 15/08 | (2006.01) |

(52) U.S. Cl.
CPC .............. G06F 3/167 (2013.01); G10L 15/22 (2013.01); G10L 21/0332 (2013.01); G10L 25/60 (2013.01); G10L 2015/088 (2013.01); G10L 2015/223 (2013.01); H04M 2250/74 (2013.01)

(58) Field of Classification Search
CPC .......................... G10L 15/22; G10L 2015/223
USPC .......................................................... 704/275
See application file for complete search history.

(56) References Cited

U.S. PATENT DOCUMENTS

| 8,340,975 | B1 * | 12/2012 | Rosenberger | ........... G10L 15/22 |
| | | | | 704/275 |
| 8,582,579 | B2 * | 11/2013 | Yousefi | ................... H04N 7/183 |
| | | | | 370/395.42 |
| 8,868,145 | B2 * | 10/2014 | Rofougaran | .......... G06F 1/1626 |
| | | | | 455/575.7 |
| 9,324,322 | B1 * | 4/2016 | Torok | ...................... G10L 15/22 |
| 9,640,179 | B1 * | 5/2017 | Hart | ........................ G10L 15/20 |

(Continued)

FOREIGN PATENT DOCUMENTS

EP   1 217 608 A2   6/2002

OTHER PUBLICATIONS

International Search Report and Written Opinion from corresponding International application No. PCT/US2016/053244, 10pp., dated Dec. 20, 2016.

(Continued)

Primary Examiner — Michael N Opsasnick
(74) Attorney, Agent, or Firm — Brinks Gilson & Lione

(57) ABSTRACT

Devices, systems, and methods provide synchronization of multiple voice-controlled devices to establish priority of one of the devices to respond to an acoustic signal, preventing other devices from responding to a single user command. Each device is configured to mediate its response to a wakeword by, after detecting the wakeword in an audio input, generating a data packet and attempting to send it to the other devices over a communication channel that prevents data collision. One device will succeed in sending the packet, while the other devices cannot until they receive the first device's packet, indicating that the first device has priority. Additionally, the devices may process their audio inputs to determine a signal quality, the signal qualities are shared between all devices, and the device with the best signal quality assumes priority.

14 Claims, 9 Drawing Sheets

(56) References Cited

U.S. PATENT DOCUMENTS

| | | | |
|---|---|---|---|
| 9,755,711 B2* | 9/2017 | Lau | H04B 7/0417 |
| 2003/0069727 A1* | 4/2003 | Krasny | G10L 15/20 |
| | | | 704/228 |
| 2008/0061984 A1* | 3/2008 | Breed | G01S 13/878 |
| | | | 340/572.7 |
| 2008/0114247 A1* | 5/2008 | Urbano | A61B 8/4472 |
| | | | 600/447 |
| 2010/0098266 A1* | 4/2010 | Mukund | G10L 21/0272 |
| | | | 381/94.7 |
| 2012/0099732 A1* | 4/2012 | Visser | G10L 21/0272 |
| | | | 381/17 |
| 2012/0327115 A1* | 12/2012 | Chhetri | H04R 3/005 |
| | | | 345/633 |
| 2013/0064098 A1* | 3/2013 | El-Saidny | H04L 1/0029 |
| | | | 370/241 |
| 2013/0070935 A1* | 3/2013 | Hui | G10K 11/16 |
| | | | 381/71.1 |
| 2014/0112496 A1* | 4/2014 | Murgia | G10L 21/0216 |
| | | | 381/92 |
| 2014/0114665 A1* | 4/2014 | Murgia | G10L 21/0216 |
| | | | 704/275 |
| 2014/0269442 A1* | 9/2014 | Hyde | H04W 4/02 |
| | | | 370/259 |
| 2015/0071190 A1* | 3/2015 | Lau | H04B 7/0417 |
| | | | 370/329 |

OTHER PUBLICATIONS

International Preliminary Report on Patentability from corresponding International application No. PCT/US2016/053244, 7pp., dated Apr. 3, 2018.

* cited by examiner

MEDIATION OF WAKEWORD RESPONSE FOR MULTIPLE DEVICES

BACKGROUND

Many user devices, such as smartphones, tablet computers, laptop computers, desktop computers, and home automation devices, can be at least partially operated by voice commands and inquiries. Typically, the voice recognition and response capabilities are a function of the operating system that the device employs. Widely-adpoted operating systems for computing devices support varying degrees of voice control; consequently, the number of voice-controlled devices is growing, as is the number of environments in which multiple voice-controlled devices can be found.

Voice-controlled devices can monitor speech within range of the device, but do not respond to all speech. In a common implementation the device listens for a "wakeword" that is assigned to the device; when the device detects that a user spoke the wakeword, the device transitions from a passive listening state to a responsive state. In the responsive state, the device processes commands or inquiries spoken subsequent to the wakeword, and often speaks back to the user and/or retrieves or modifies data. If multiple devices that activate on the same wakeword are in audible range and detect the wakeword, they may all enter the responsive state and attempt to execute the command or respond to the inquiry. This can lead to different interpretations of the command/inquiry, unwanted repeat access to the same data, audible dissonance such as feedback and reverberation when multiple devices respond, and other problems.

BRIEF DESCRIPTION OF DRAWINGS

The detailed description is set forth with reference to the accompanying drawings. The use of the same reference numbers in different figures indicates similar or identical items or features. Various embodiments in accordance with the present disclosure will be described with reference to the drawings, in which.

DETAILED DESCRIPTION

Figure 1A:
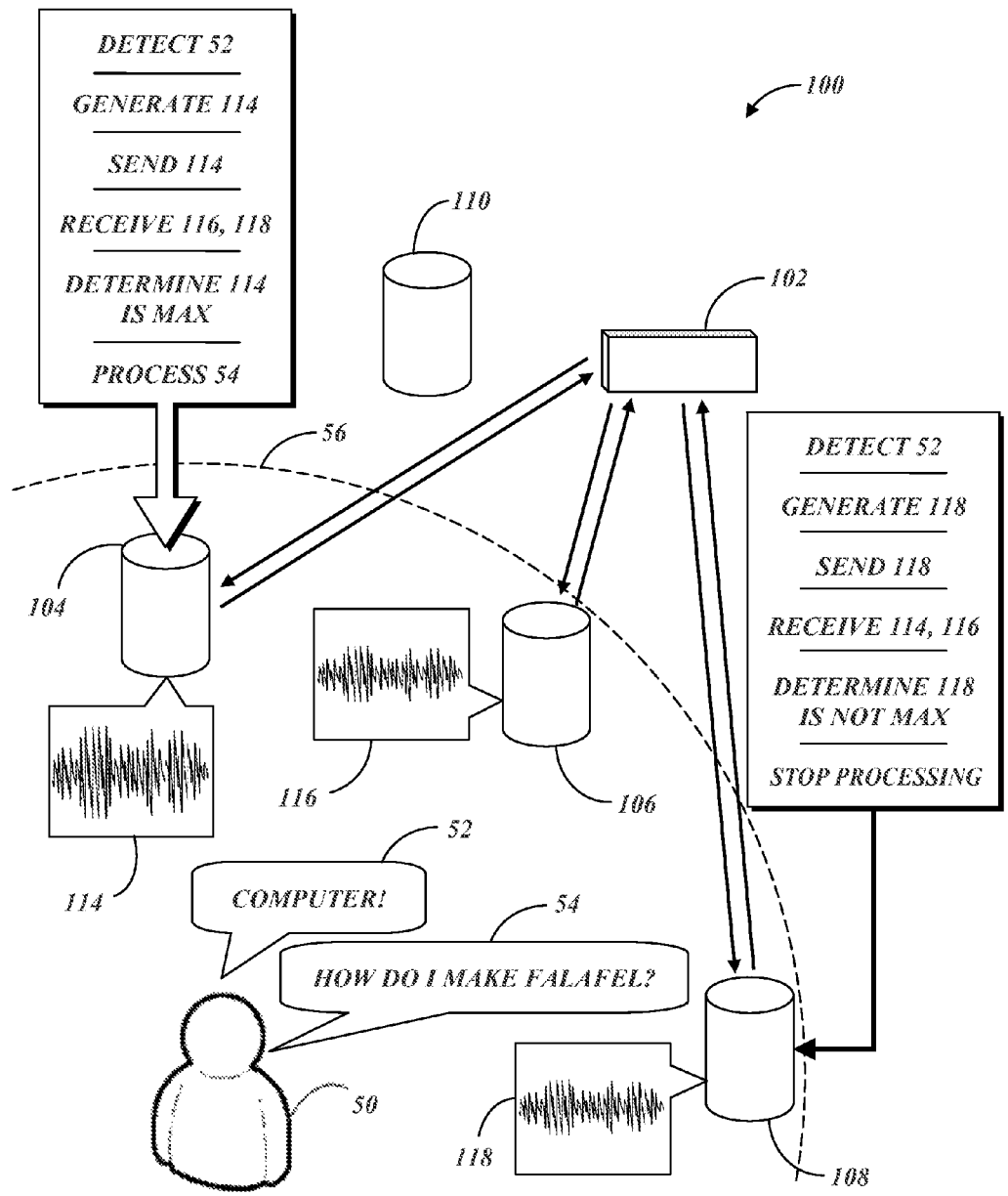
FIG. 1A is a diagram of an example system in which voice-controlled user devices share an access point and are configured to mediate wakeword recognition according to signal strength.

The present disclosure provides systems, device configurations, and processes for mediating, synchronizing, and/or prioritizing the activation of a voice-controlled device in response to a "wakeword" acoustic activation signal. The disclosure pertains in particular to such mediated activation of the voice-controlled device in an environment where a plurality of voice-controlled devices are present, the voice-controlled devices activate on the same or similar wakeword, and more than one of the voice-controlled devices may be in the audible range of an acoustic signal. The mediated response is optimized when each voice-controlled device in the environment is configured to mediate its own response, with respect to the other devices, using the same technique. That said, the performance of the voice-controlled devices in the environment is improved overall even if only one or some of the voice-controlled devices are so configured. Additionally or alternatively, a server, router, hub, or other access point device that manages network communications between the voice-controlled devices may be configured to mediate the devices' responses as described herein.

In one implementation, a device's response priority is a binary determination—either the device has priority (or "right-of-way") to respond to the wakeword, and transitions to the responsive state in which the device further processes a command or inquiry following the wakeword in the acoustic signal; or, the device does not have priority to respond to the wakeword, and remains in the passive listening state or another non-responsive state, or transitions back to the passive listening state, but regardless does not transition into the responsive state and does not further process the acoustic signal following the wakeword. Other implementations are contemplated, such as a shared-priority system where two or more devices can be configured to respond to the same command/inquiry in the same manner or a different manner. For example, the devices may recognize a command to play music on two or more of the devices.

In one implementation, response priority is determined according to the highest quality capture of the acoustic signal. Each device in the audible range of the acoustic signal may record an audio input of the acoustic signal and perform signal processing of its audio input to produce a quality value, as described further below. The quality value is a quantified data element that may be shared with the other devices; obtaining a pool of the quality values from the devices in the audible range of the acoustic signal, each device may identify the best quality recording. If the best quality recording is the device's audio input, the device assumes priority of response. If the best quality recording is not the device's audio input, the device does not assume priority.

In another implementation, response priority is determined according to the fastest acknowledgment of the wakeword from among the detecting devices. Each device in the audible range of the acoustic signal may record an audio input of the acoustic signal and determine that the audio input includes the wakeword. The device then prepares and attempts to transmit a data packet acknowledging the wakeword to the other devices across a communication network. Data collision detection processes and other network constraints may affect the timing by which each device transmits its packet and receives packets from the other devices, as described below. These constraints are factored into the mediation process, such that the same device's packet is the first to be received by all of the devices. Due to the built-in random wait times for carrier-sense multiple access (CSMA) in Wi-Fi and idiosyncrasies in data handling of different access point devices, the acknowledgement, transmission, and receipt of the packets is essentially random; nevertheless, one packet will be received first by all devices. Each device then determines if the received packet is its own packet; if so, the device assumes response priority, and if not, the device does not assume response priority.

In other implementations the "quality" and "speed" mediation techniques may be combined to improve accuracy or speed of the mediation. For example, if two quality values are equal and are the best quality, the packet that was received first may be used to determine priority. In another example, a quality threshold may be predetermined, and if the quality value of the first received packet does not meet the threshold, the first received packet may be discarded and the next received packet that meets the quality threshold may be used.

Figure 1B:
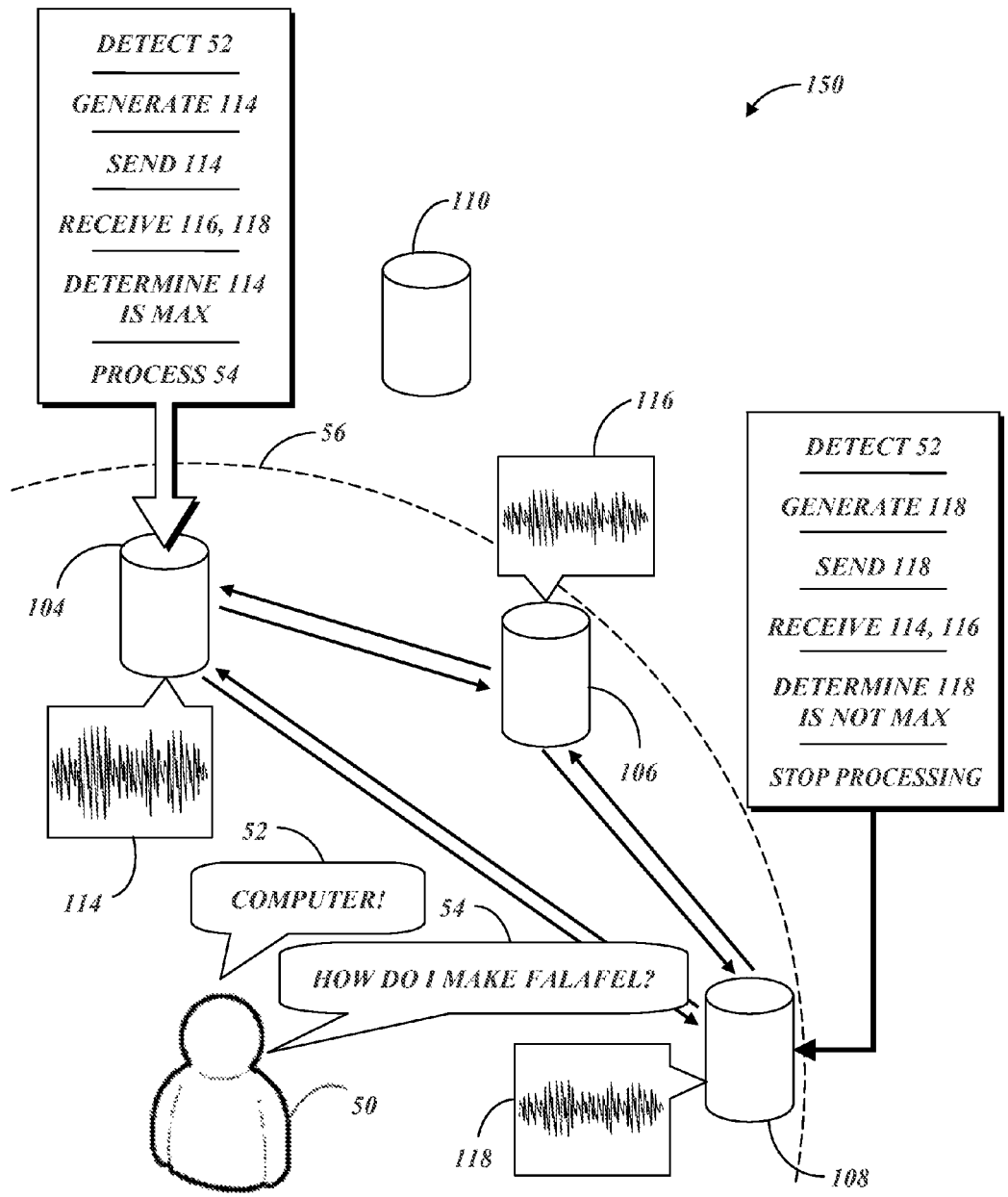
FIG. 1B is a diagram of an example system in which voice-controlled user devices communicate directly with each other to mediate wakeword recognition according to signal strength.

FIGS. 1A and 1B illustrate systems 100, 150 that implement the "quality" mediation technique. Referring to FIG. 1A, the system 100 includes an access point (AP) device 102 that facilitates access by a plurality of user devices 104, 106, 108, 110 to a communication network. The AP device 102 may be a router, modem, ethernet hub or switch, hotspot dongle, server, or any other suitable device that allows network-enabled devices to connect to a communication network. The AP device 102 facilitates a wired or wireless local area network (LAN) that uses any suitable communication protocol or suite of protocols. In some embodiments, the LAN may be a Wi-Fi network. The AP device 102 may further provide access for LAN-connected devices to a wide-area network such as the Internet.

The user devices 104-110 are voice-controlled devices that respond to the same wakeword and are configured to determine response priority using quality values of their recorded signals. Any voice-controlled computing device may be assembled and/or configured with the present hardware and software modules, and the disclosure contemplates home and office automation devices, personal assisting devices, mobile and non-mobile computing devices, security systems, medical facility systems, industrial automation systems, and the like, as non-limiting examples only. The user devices 104-110 are configured to connect to the LAN provided by the AP device 102, and may communicate with each other by sending data to the AP device 102 over the LAN for delivery to a particular device or set of devices. The transmitted data may be raw data or formatted data, and may be transmitted via bit streaming, packet-switching, or another suitable technique that is supported by the LAN protocol(s).

The user devices 104-110 are configured to wait in the passive listening state, receive an acoustic signal, convert the acoustic signal to an audio input readable by the user device 104-110, and detect a wakeword 52 in the audio input; these initial processes and the hardware and software modules that perform them are described below. The mediation process begins at this point, where current voice-controlled devices would transition from the passive listening state to the responsive state and begin processing the command or inquiry 54 that follows the wakeword 52. The user devices 104-110 are configured to analyze the signal embodied in the audio input to determine its quality and produce a quality value that generally quantifies the clarity and/or amplitude of the recorded acoustic signal.

As shown by example in FIG. 1A, three user devices 104, 106, 108 are within an audible range 56 of the acoustic signal that is a user 50 speaking the wakeword 52 and inquiry 54; these three user devices 104-108 detect the wakeword 52 and must mediate their response. A fourth user device 110 is not in the audible range 56; the fourth user device 110 either may not detect the audible signal of the wakeword 52, or may detect the audible signal but determine that the amplitude is too low or the audible signal is too unclear to be processed. The fourth user device 110 does not seek to respond to the wakeword 52 and does not participate in the mediation.

The first user device 104 generates a quality value 114 from its audio input; in the same manner, the second user device 106 generates a quality value 116 and the third user device 108 generates a quality value 118 from their respective audio inputs. To maintain accuracy in the subsequent comparison of quality values 114, 116, 118, the user devices 104-108 may apply the same signal processing techniques using the same parameters for their respective audio inputs. Each user device 104-108 then sends its respective quality value 114-118 to the AP device 102 to be delivered to the other user devices 104-108, as indicated by the arrows between the AP device 102 and the user devices 104-108. In one example, each user device 104-108 may additionally transmit an instruction to the AP device 102 that the transmitted data should be multicasted to all or a subset of the devices on the network. Additionally or alternatively, the transmitted data may include an indicator that the data belongs to a certain class of data, such as "response mediation," which may instruct the AP device 102 to only send the data to certain other devices on the network, such as only voice-controlled devices or only devices that also send "response mediation" data to the AP device 102. The AP device 102 sends each quality value (e.g., the first quality value 114) at least to the user devices that are participating in the mediation and did not generate the quality value (e.g., user devices 106, 108).

The user devices 104-108 may wait, as described below, to receive all of the quality values 114-118. Each user device 104-108 compares all of the quality values 114-118 to each other to determine which user device's 104-108 audio input is the best quality. The user device with the best quality value (e.g., the first user device 104) transitions to the responsive state and processes the inquiry 54, and the other user devices (e.g., the second user device 106 and the third user device 108) stop processing the audio signal until the next wakeword is detected.

Referring to FIG. 1B, the system 150 includes the same components as the system 100 described above, except that the system 150 uses a different communication method between user devices 104-110, eliminating the AP device 102. Additionally, the user devices 104-110 may be modified to use the communication method, although the disclosure contemplates the user devices 104-110 being so enabled in the system 100. The system 150 uses peer-to-peer communication components and protocols to enable the user devices 104-110 to communicate with each other directly, as indicated by the arrows between the user devices 104-108. Non-limiting examples of such peer-to-peer connectivity include Bluetooth and Wi-Fi Direct, among others. The user devices 104-110 may thus be compliant with the same peer-to-peer standard in order to use it. In the system 150, each user device 104-108 that is participating in the mediation may establish a communication channel with each of the other mediating user devices 104-108, and may send its respective quality value 114-118 to each of the other mediating user devices 104-108 over the established channel. The mediation then proceeds as described above.

Figure 2:
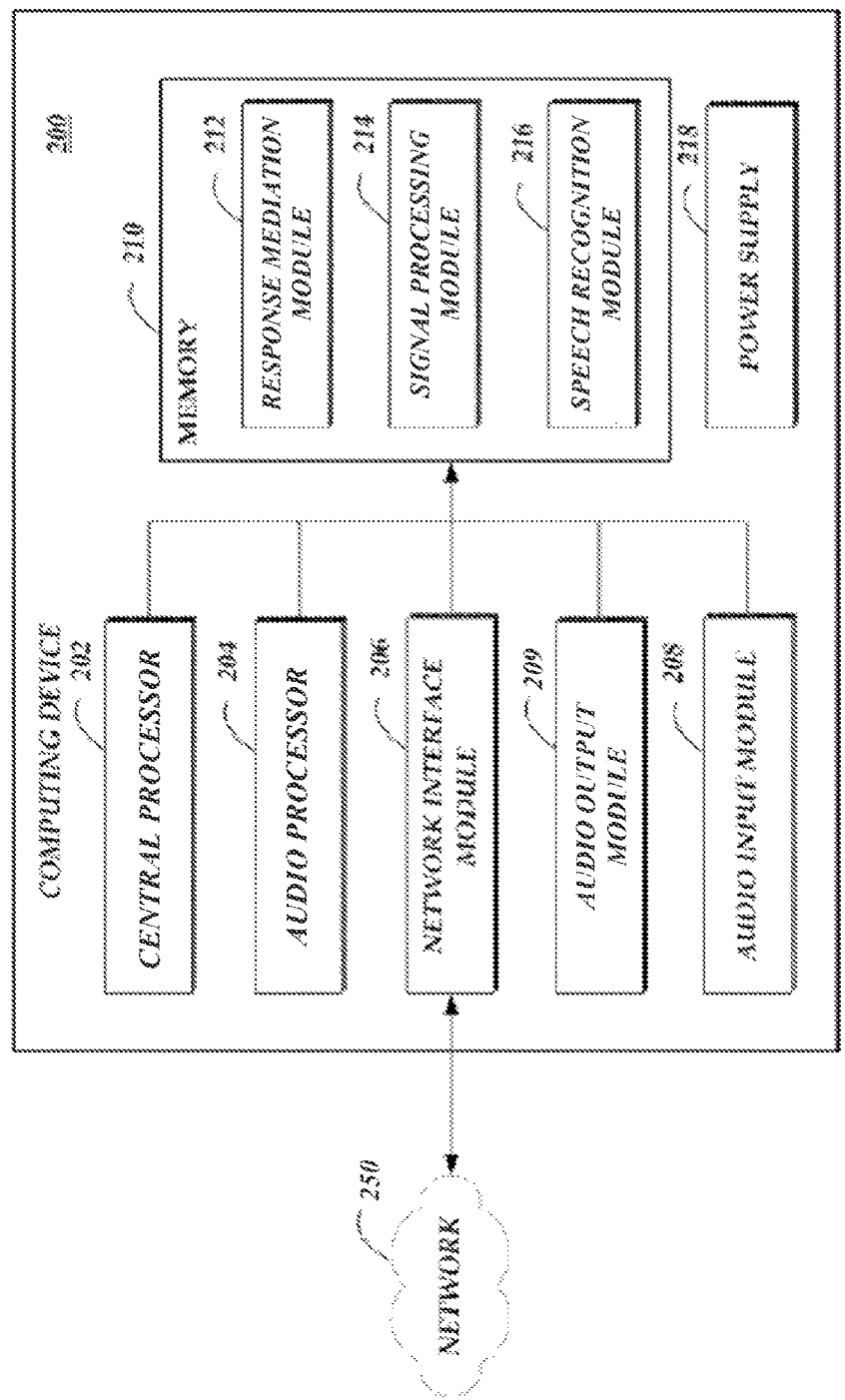
FIG. 2 is a schematic diagram of a computing device in accordance with the disclosure.

FIG. 2 illustrates a computing device 200 that can perform the present response mediation processes. The computing device 200 includes a central processor 202, an audio processor 204, a network interface module 206, an audio input module 208, an audio output module 209, and memory 210, all of which may communicate with one another by way of a communication bus. The computing device 200 may also include a power supply 218, which may provide power to the various components of the computing device 200.

The central processor 202 may include one or more microprocessors specially configured to communicate with the memory 210 to implement various software modules and associated program instructions stored therein; such modules include a response mediation module 212, a signal processing module 214, and a speech recognition module 216. The memory 210 generally includes RAM, ROM, flash memory, solid state memory, and/or other persistent or non-transitory computer-readable storage media. The response mediation module 212 may be stored as program instructions in memory. When executed by the central processor 202, the response mediation module 212 may configure the central processor 202 to perform the response mediation process described herein, such as those illustrated in FIGS. 1A, 1B, and 3-7. Execution of the response mediation module 212 may configure or instruct the central processor 202 to access and/or use other modules of the computing device 200, including without limitation: accessing the audio processor 204 to retrieve device-readable audio input; executing the signal processing module 214 to obtain a quality value of the audio input; and accessing the network interface module 206 to send and receive data packets.

The memory 210 may additionally store a signal processing module 214 that provides computer program instructions for use by the central processor 202 in analyzing a recorded and/or converted audio input. The signal processing module 214 may include executable algorithms to determine the quality of the audio input. Non-limiting examples of such algorithms for obtaining quality values include calculation of the signal-to-noise ratio, frequency and/or amplitude detection, comparison to a threshold quality, automatic gain control processing, and the like. The memory 210 may additionally store a speech recognition module 216 that provides computer program instructions for use by the central processor 202 in identifying that an audio input contains speech, and/or contains particular words or phrases, such as the wakeword. The speech recognition module 216 may be any program that produces speech recognition results, such as a dictation application, a speech processor native to the operating system of the computing device 200, or an application programming interface. The memory 210 may store one or more language models for the wakeword, and the speech recognition module 216 may configure the central processor 202 to compare the audio input to the stored language model to identify the wakeword in the audio input.

The audio processor 204 may be a microprocessor or group of microprocessors, an integrated or discrete circuit, or a software-implemented module, that converts an acoustic signal received by the computing device 200, or an electrical signal representing the acoustic signal, into an audio input that is readable by the central processor 202. In one example, the audio processor 204 may be an analog-to-digital converter. The audio processor 204 may receive the signal generated by the audio input module 208 and generate the audio input therefrom. The audio input module 208 may include an audio input device, such as a microphone or array of microphones, whether analog or digital. The microphone or array of microphones may be implemented as a directional microphone or directional array of microphones. In some embodiments, the audio input module 208 receives and records the acoustic signal and outputs the recording to the audio processor 204. The audio input module 208 may also receive instructions from the audio processor 204 to set a sampling rate (whether in frame rate or bitrate) for obtaining audio. The audio input module 208 may also (or instead) include one or more piezoelectric elements and/or micro-electrical-mechanical systems (MEMS) that can convert acoustic energy to an electrical signal for processing by the audio processor 204. The audio input module 208 may further be provided with amplifiers, rectifiers, and/or other audio processing components as desired.

The network interface module 206 may provide the computing device 200 with connectivity to one or more networks 250, such as a LAN or a wide-area network. The network interface module 206 may additionally or alternatively enable peer-to-peer connectivity directly to other devices, such as via Bluetooth or Wi-Fi Direct. The central processor 202 may send instructions and information to, and receive instructions and information from, remote computing devices that also communicate via the network 250. In some embodiments, the network interface module 206 comprises a wireless network interface that provides the computing device 200 with connectivity over one or more wireless networks.

In some embodiments, the network interface module 206 is selectively activated. While the network interface module 206 is in a deactivated or "sleeping" state, it may provide limited or no connectivity to networks or computing systems so as to conserve power. In some embodiments, the network interface module 206 is in a deactivated state by default, and becomes activated responsive to a signal from the central processor 202. While the network interface module 206 is in an activated state, it may provide a relatively greater amount of connectivity to networks or computing systems, such that the network interface module 206 enables the computing device 200 to send audio input to a remote computing device and/or receive audio input from a remote computing device or a speech recognition result from a speech recognition server, described below. In a particular, non-limiting example, the network interface module 206 may be activated responsive to the central processor 202 determining that an audio input includes a wakeword.

The audio output module 209 may be a speaker or an array of speakers, along with any requisite electronic components for converting an analog or digital signal of the computing device 200 into an acoustic signal for output by the speaker. The audio output module 209 may communicate indicators of a state of the computing device 200, such as when the computing device 200 is ready to receive a command. The audio output module 209 may output results of an input command or inquiry, once the command/inquiry is processed by the computing device 200. The audio output module 209 may also output other audio data, such as music stored in memory 210 or obtained via data stream from a remote device.

One or more additional input devices such as light sensors, position sensors, image capture devices, or the like may be provided with the computing device 200. Such additional input devices are not shown in FIG. 2 so as not to obscure the principles of the present disclosure. In some embodiments, an additional input device may detect the occurrence or non-occurrence of a condition. Information pertaining to such conditions may be provided to the central processor 202 to determine whether one or more components of the computing device 200 should be activated or deactivated. In one embodiment, the additional input device includes a light sensor configured to detect a light level. In another embodiment, the additional input device includes an image capture device configured with facial recognition capabilities. Still further input devices may include, for example, user input devices such as mice, keyboards, touchscreens, and/or keypads. Likewise, output devices such as LED indicators, displays, speakers, and/or headphones, for example, may be provided.

Figure 3:
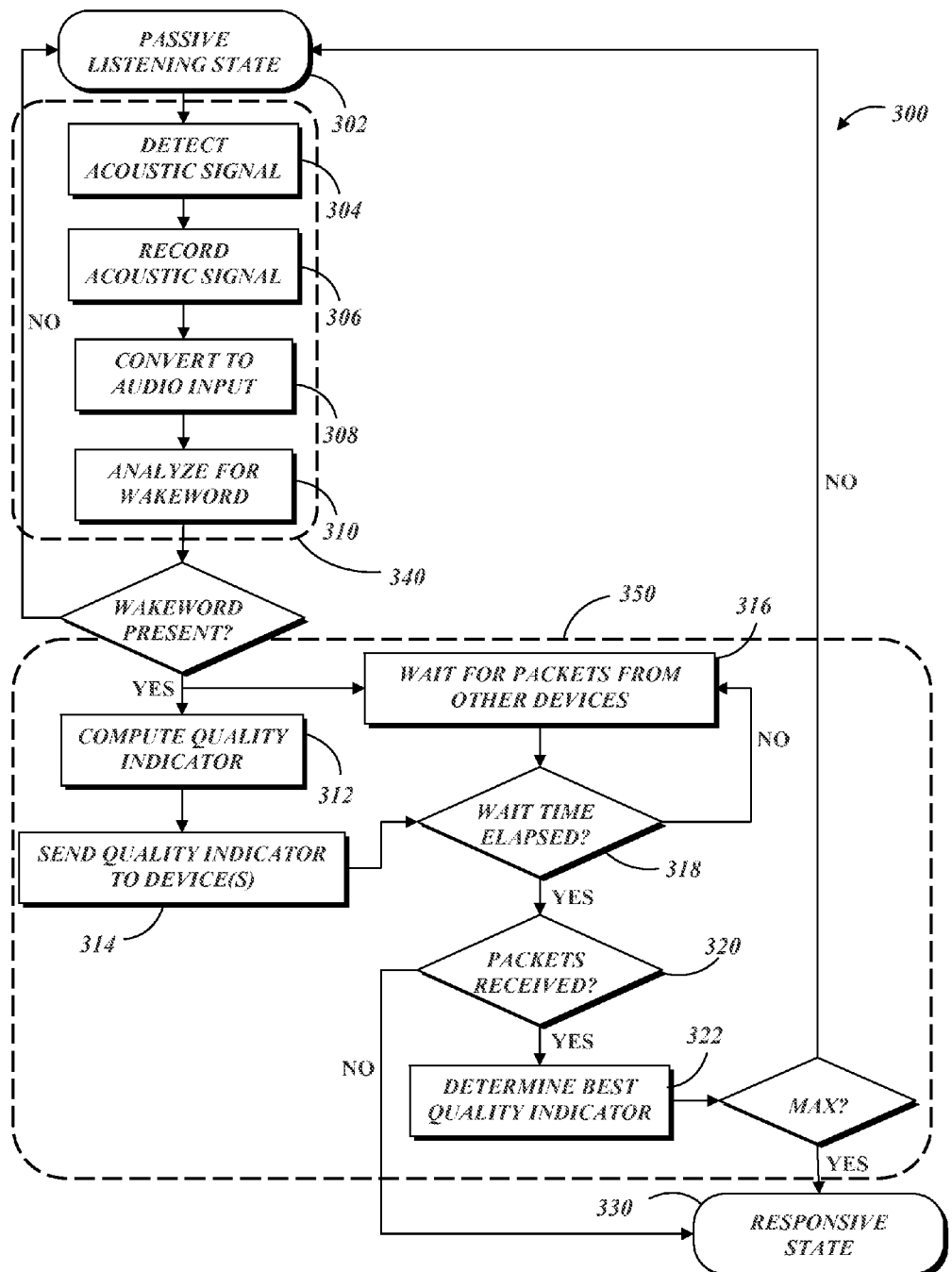
FIG. 3 is a flowchart of a method of determining response priority according to signal strength.

FIG. 3 illustrates an exemplary method 300 performed by a computing device (e.g., the first user device 104 of FIG. 1A and the computing device 200 of FIG. 2) to coordinate a response to a user-spoken wakeword and command/inquiry with any other voice-controlled user devices that (1) are configured to respond (i.e., activate, or transition to a responsive state) to the wakeword, and (2) detected the wakeword in the acoustic signal (i.e., are within the audible range 56 of FIG. 1A). Initially, the computing device may be in the passive listening state 302, wherein the computing device monitors the acoustic signals in its range but does not permanently record the acoustic signals or respond to them. The computing device may be in another device state, provided the state allows the computing device to detect and respond to the wakeword. For example, the steps 304, 306, 308, and 310 may cause the computing device to transition (or may result from the computing device transitioning) from the passive listening state 302 to one or more wakeword detection states 340.

At step 304, the computing device detects an acoustic signal, such as at a microphone of the computing device, and at step 306 the computing device records the acoustic signal. This may be a temporary recording, such as an output signal from the microphone, of a continuous input stream to the computing device. At step 308, the computing device converts the recording into an audio input readable by the computing device, if necessary. The audio input may include only the wakeword, additionally or alternatively may include audio data occurring before the wakeword was spoken, and additionally or alternatively may include audio data occurring after the wakeword was spoken, such as the input command or inquiry. At step 310, the computing device analyzes the audio input, such as by applying speech recognition algorithms, to determine if the wakeword is present in the audio input. If the wakeword is not present, the computing device returns to the passive listening state 302 and continues passively analyzing the input stream.

If the wakeword is present in the audio input, the computing device may transition to a wakeword mediation state 350. At step 312, the computing device may compute or obtain a quality value of the audio input. In various, non-limiting embodiments, the quality value computed by the computing device may be a signal strength value, which value may represent a signal-to-noise ratio quality value, a peak amplitude or an average amplitude of the audio input, a frequency spectrum characteristic, one or more automatic gain control settings used to modulate the recorded signal amplitude, a power level, a received signal strength indicator (RSSI), or another indicator of the signal strength. In another embodiment, the computing device may produce a combined quality value that includes one or more of the above signal strength values and potentially other values. The quality value may be calculated using the entirety of the audio input, or the computing device may identify a portion of the audio input, such as the portion including the wakeword and/or the input command/inquiry, and obtain the quality value from analysis of the portion. In some embodiments, the computing device may send the audio input to a remote device, such as a speech recognition server or signal processing device, and receive the quality value in return. Additionally or alternatively, the speech recognition server may analyze the audio input for the wakeword (step 310).

At step 314, the computing device may send (e.g., via unicast) the quality value to the AP device for the computing device's LAN, to be multicasted to other computing devices participating in the mediation as described above with respect to FIG. 1A. Alternatively, at step 314 the computing device may send the quality value directly to the other computing devices via a peer-to-peer communication channel as described above with respect to FIG. 1B. The quality value may be sent as a bit stream, or the computing device may generate a "local" data packet for its own data, and may add the quality value to the data packet. The data packet may include additional information, such as instructions for distributing the data packet, information about the contents, or a device identifier for the computing device. For example, the data packet may include instructions for the AP device to multicast the data to all devices connected to the AP device, or to a group of devices that includes the other voice-controlled devices that are remote from the computing device but are in communication with each other and may be participating in the wakeword mediation. In another example, the data packet may include a wakeword timestamp that indicates the time when the device received the wakeword. The participating devices may use wakeword timestamp of each data packet to verify that all recorded signals being mediated are recordings of the same acoustic signal; that is, if a wakeword timestamp of one of the data packets differs from the other wakeword timestamps by more than a suitable offset (e.g., 50 ms, equivalent to an audible range of about 50 feet for the acoustic signal), the participating devices may discard that data packet as not having recorded the same speech.

Meanwhile, at step 316, once the wakeword is identified in the audio input, the computing device may begin listening on a channel of the communication network for the quality values (e.g., included in data packets) sent by the remote computing devices. The computing device may continue to listen for and receive incoming quality values for a predetermined time period (i.e., wait time) to receive all of the data packets. The wait time may be a duration that is generally suitable to expect transmission of all data packets, determined by measuring the transmission speed of the system. Alternatively, the wait time may be dependent on the number of voice-controlled computing devices in an environment. This number may be determined by a polling method, whereby each computing device periodically sends an acknowledgement to the other computing devices, indicating its presence in the system. Other methods of determining the number of devices may be used, such as by determining (e.g., by polling the AP device) a number of devices that belong to a multicast group, of which the computing device may also be a member. The wait time may be incremented a predetermined amount for each computing device in the environment. The wait time and/or the incremental amount to increase the wait time for each device may be based on an expected packet transmission time, which may be a known number based on the type and/or bandwidth of the communication network, how many devices are using the communication network, distance of the transmitting and receiving devices from the AP device or from each other, interference and other noise on the transmission frequency, packet size, and other factors. For example, the incremental amount may be equal to a maximum packet transmission time, which on a 100 Mbps LAN is about 120 microseconds for a 1.5 kilobyte packet. Alternatively, the expected packet transmission time may be determined by measuring the transmission speed of the system, e.g., by transmitting echo request packets at intervals. The wait time may be the same for all computing devices engaged in the response mediation.

At step 318, once the computing device has sent its quality value it determines if the predetermined time period has elapsed. If so, at step 320 the computing device determines if it received packets from any remote computing devices. If not, the computing device is the only device responding to the wakeword and can transition to the responsive state 330. If packets were received, at step 322 the computing device compares the received quality values, as well as its own quality value, to determine the highest quality value and thus the best quality audio input among those recorded of the acoustic signal. If the computing device determines that its own audio input is the best quality, the computing device may transition to the responsive state 330. If the computing device determines that it does not have the best quality audio input, the computing device may return to the passive listening state 302.

In another embodiment, rather than waiting until the wait time has elapsed to compare its quality value to the received remote quality values, the computing device may compare its quality value to each remote quality value as it is received. Thus, if one of the remote quality values is greater than the quality value of the computing device, the computing device can immediately stop processing the audio input and return to the passive listening state 302, even if the wait time has not elapsed. If the wait time does elapse and the computing device's quality value is still the highest, the computing device may transition to the responsive state 330.

Figure 4:
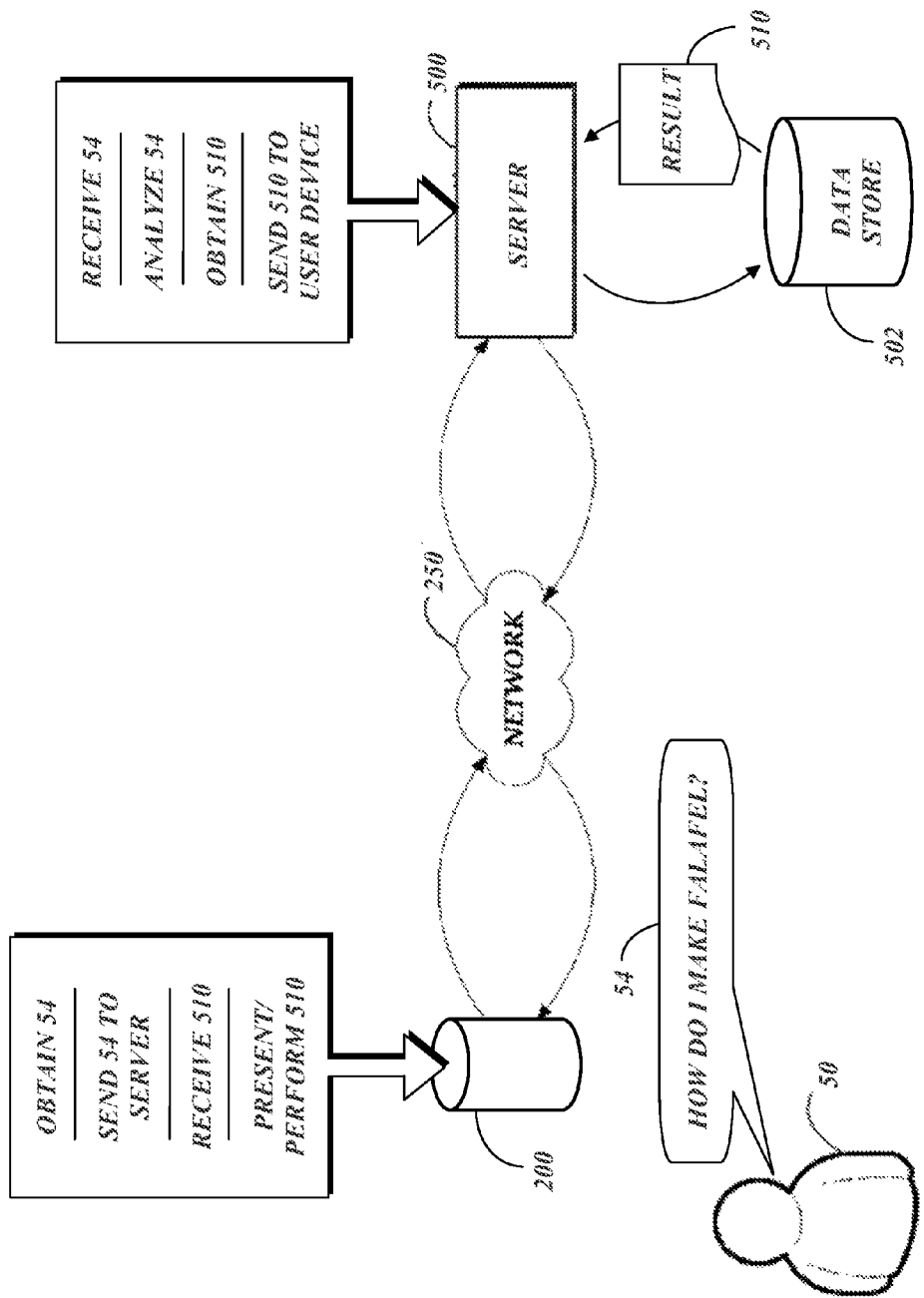
FIG. 4 is a diagram of a system for processing an input command or inquiry by a user device in accordance with the disclosure.

Referring to FIG. 4, when a computing device 200 assumes response priority it transitions to the responsive state. In the responsive state, the computing device 200 continues to process the audio signal related to the received wakeword. In some embodiments, the computing device 200 has already recorded the command or inquiry (collectively identified as inquiry 54 that follows the user 50 speaking the wakeword; the computing device 200 may further have already converted the acoustic signal containing the inquiry 54 into the audio input. In other embodiments, once the computing device 200 assumes response priority, it may then continue capturing and converting the acoustic signal. The computing device 200 may facilitate this by providing an audio or visual indicator to the user, signifying the computing device 200 is ready to receive the inquiry 54. Once the audio input containing the inquiry 54 is obtained, the computing device 200 may send the audio input to a speech recognition server 500 in communication with the computing device 200 over the network 250. The speech recognition server 500 may be a single server or group, cluster, or distributed network of servers. It will be understood that there could be several cooperating servers 500 of homogenous or varying types, layers or other elements, processes or components, which may be chained or otherwise configured, which can interact to perform tasks such as obtaining data from an appropriate data store 502 that is accessible locally to the server 500 or remotely over the network 250 or another network. Servers, as used, may be implemented in various ways, such as hardware devices or virtual computer systems. In some contexts, servers may refer to a programming module being executed on a computer system. The server 500 can include any appropriate hardware, software and firmware for integrating with the data store 502 as needed to execute aspects of one or more applications for the computing device 200, handling some or all of the data access and business logic for an application. The server 500 may provide access control services in cooperation with the data store 502 and is able to generate content, including an interpretation of the inquiry 54 that can be used by the computing device 200 to execute the command or respond to the inquiry 54. This interpretation may be sent back to the computing device 200 as a result 510 of the command/inquiry interpretation.

In addition, the server 500 can perform internet searches and retrieve or generate text, graphics, audio, video and/or other content related to the input command or inquiry 54, which may be served as the result 510 to the computing device 200 in any suitable format, including HyperText Markup Language ("HTML"), Extensible Markup Language ("XML"), JavaScript, Cascading Style Sheets ("CSS"), or another appropriate client-side structured language. Content transferred to the computing device 200 may be processed by the computing device 200 to provide the content in one or more forms including forms that are perceptible to the user audibly, visually and/or through other senses including touch, taste, and/or smell. For example, the server 500 can return a textual transcript comprising an answer to the inquiry 54, and the computing device 200 can use a speech module to convert the transcript from text to an audio signal comprising speech that reads the text, and can then output the audio signal via one or more speakers. The handling of all requests and responses, as well as the delivery of content between the computing device 200 and the server 500, can be handled by the server 500, such as a web server using PHP: Hypertext Preprocessor ("PHP"), Python, Ruby, Perl, Java, HTML, XML, or another appropriate server-side structured language in this example. It should be understood that a standalone server 500 is not required and is merely an example component, as structured code discussed can be executed on any appropriate device or host machine as described herein. Further, operations described as being performed by a single device may, unless otherwise clear from context, be performed collectively by multiple devices, which may form a distributed and/or virtual system.

The data store 502 can include several separate data tables, databases, data documents, dynamic data storage schemes and/or other data storage mechanisms and media for storing data relating to speech recognition or to execution of the commands or responses to the inquiries. The data store 502 may be operable, through logic associated therewith, to receive instructions from the server 502 and obtain, update, or otherwise process data in response thereto. The server 502 may provide static, dynamic or a combination of static and dynamic data in response to the received instructions. Dynamic data, such as data used in web logs (blogs), shopping applications, news services and other applications may be analyzed or generated by server-side structured languages as described or may be provided by a content management system ("CMS") operating on, or under the control of, the server 500.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure. The environment, in one embodiment, is a distributed and/or virtual computing environment utilizing several computer systems and components that are interconnected via communication links, using one or more computer networks or direct connections. The depictions of the example devices and environments herein should be taken as being illustrative in nature and not limiting to the scope of the disclosure.

Figure 5:
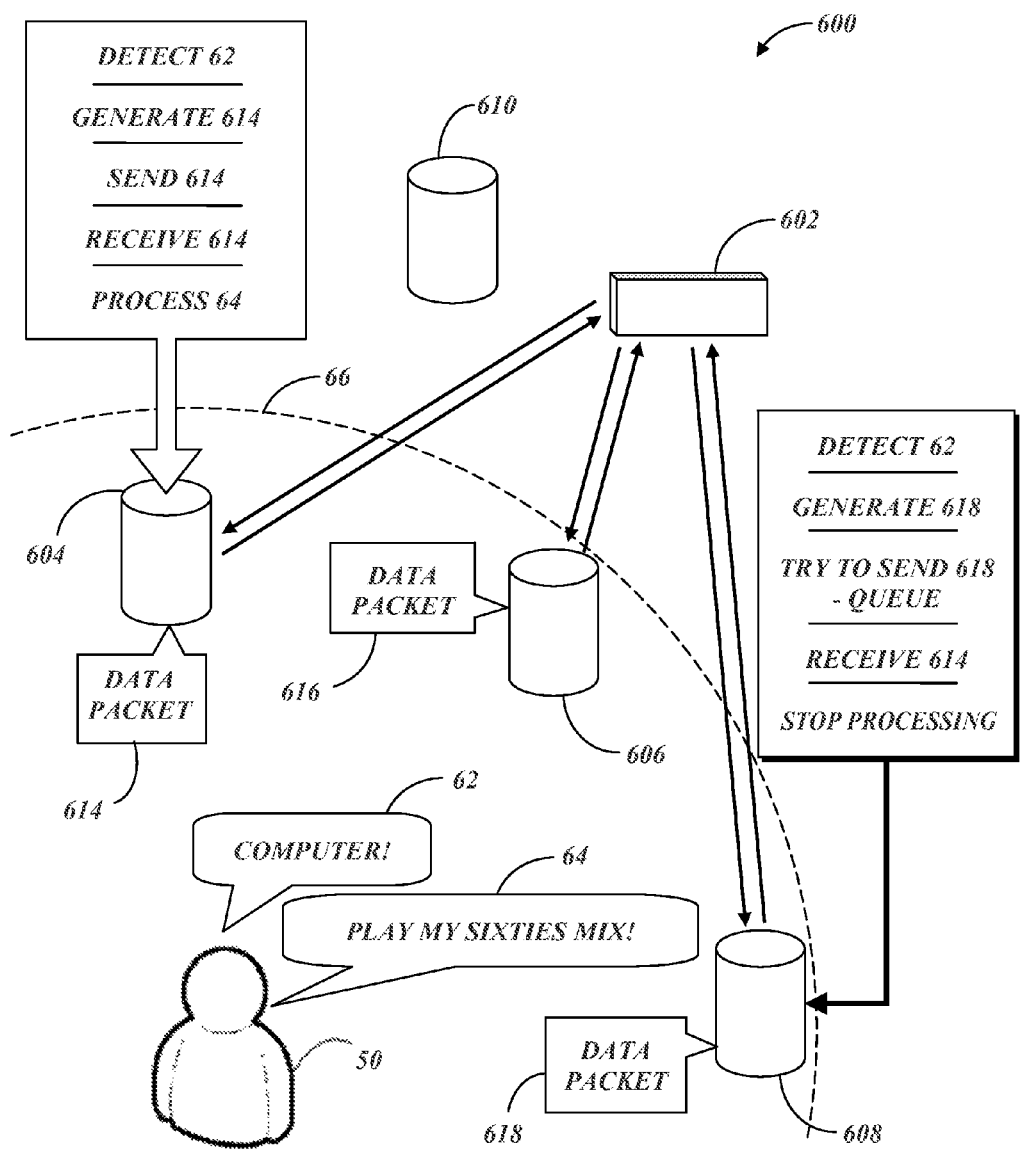
FIG. 5 is a diagram of an example system in which voice-controlled user devices share an access point and are configured to mediate wakeword recognition according to speed of packet multicasting.
Figure 6:
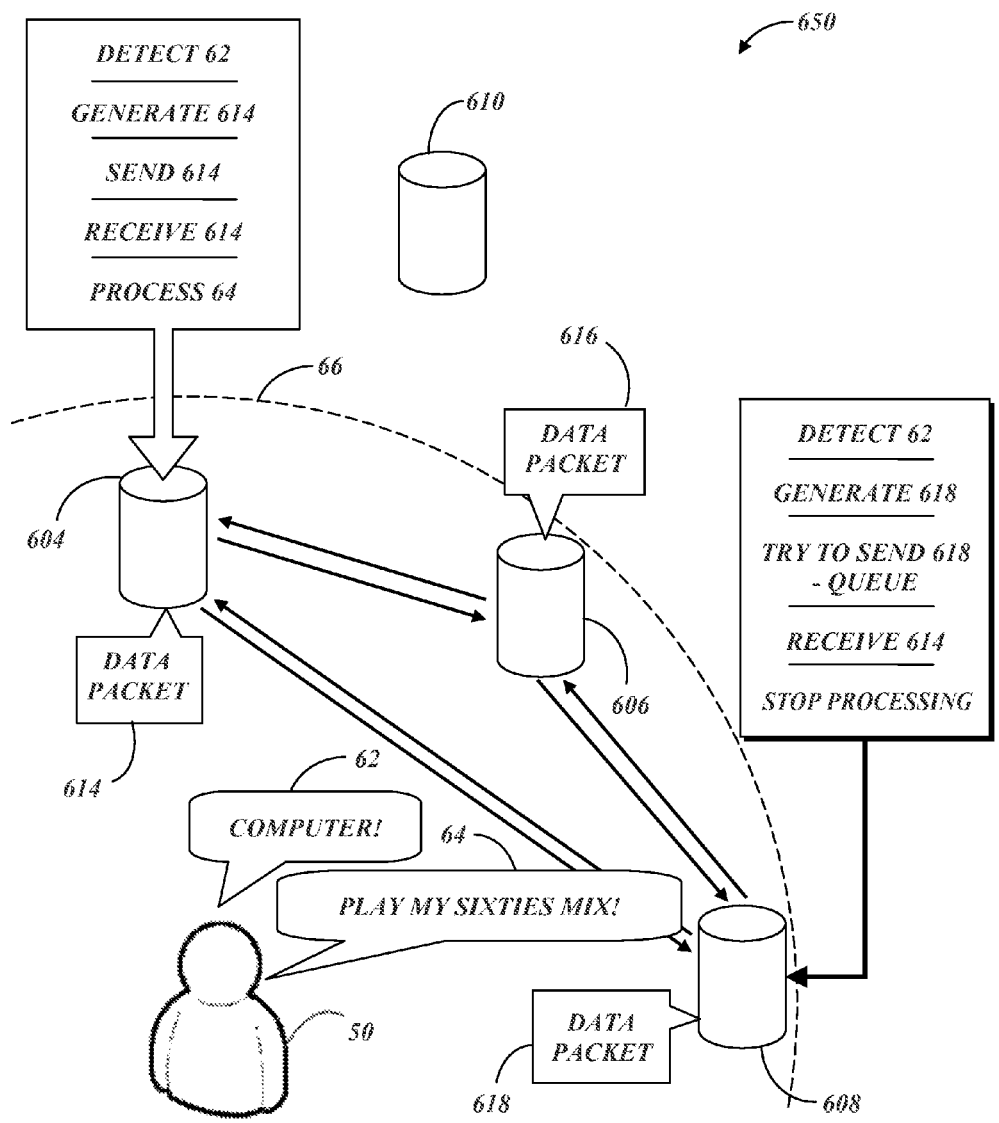
FIG. 6 is a diagram of an example system in which voice-controlled user devices communicate directly with each other to mediate wakeword recognition according to speed of packet multicasting.

FIGS. 5 and 6 illustrate systems 600, 650 that implement the "speed" mediation technique. Referring to FIG. 5, the system 600 includes an access point (AP) device 602 that facilitates access by a plurality of user devices 604, 606, 608, 610 to a communication network. The configurations of the AP device 602 and user devices 604-610 are described above with respect to FIG. 1A. In particular with respect to the mediation technique of the system 600, the LAN provided by the AP device 602 may be a Wi-Fi network or another type of network that provides a communication channel that applies a collision avoidance protocol to traffic on the channel. A Wi-Fi network is used in the description below. Wi-Fi networks manage traffic using the carrier sense multiple access with collision avoidance (CSMA/CA) protocol. CSMA/CA protocol requires all devices on the network to transmit data packets over the channel only when the channel is idle. Thus, a user device 604-610 cannot transmit its data packets if another user device 604-610 is transmitting.

As shown by example in FIG. 5, three user devices 604, 606, 608 are within an audible range 66 of the acoustic signal that is a user 50 speaking the wakeword 62 and inquiry 64; these three user devices 604-608 detect the wakeword 62 and must mediate their response. A fourth user device 610 is not in the audible range 66; the fourth user device 610 either may not detect the audible signal of the wakeword 62, or may detect the audible signal but determine that the amplitude is too low or the audible signal is too unclear to be processed. The fourth user device 610 does not seek to respond to the wakeword 62 and does not participate in the mediation.

The user devices 604-608 participating in the mediation each produce a respective data packet 614, 616, 618 upon detecting the wakeword 62. The data packets 614-618 may contain very little data—in some embodiments, the data packet 614-618 may contain only a device identifier for the user device 604-608 that generated the data packet 614-618. The data packets 614-618 are therefore generated very quickly, and subsequently each user device 604-608 attempts to send its data packet 614-618 to the AP device 602 for multicasting to the other user devices 604-608 as described above. In this embodiment, one or more of the user devices 604-608 might find the channel idle and successfully send its data packet 614-618 to the AP device 602. However, if one of the user devices (e.g., user device 604) or the AP device 602 is transmitting, due to the collision avoidance protocol the other user devices 606, 608 will find the channel in use and will fail, at first, to send their packets 616, 618. After failing, the user devices 606, 608 may queue their packet transmissions and continue to try to access the channel.

Due to data transmission problems and idiosyncrasies in AP devices, the communication channel may become available before the first transmitted data packet 614 is multicast by the AP device 602 to the other user devices 606, 608. The user devices 606, 608 may successfully transmit their data packets 616, 618. Furthermore, one of the data packets 616, 618 may even be multicast before the first data packet 614 is processed by the AP device 602. In this embodiment, the first data packet multicast by the AP device 602 will be the first data packet received by all participating user devices; this determines the user device with response priority. Additionally, the first data packet multicast will occupy the communication channel, preventing further data packet transmissions, and those pending data packet transmissions will be canceled once each device 604-608 receives the multicasted data packet. As exemplified in FIG. 5A, the user devices 606, 608 receive the data packet 614 from the first user device 604, and the first user device 604 will receive back its own data packet 614. The first user device 604 proceeds to process the input command 64, and the other user devices 606, 608 stop processing the audio signal.

Referring to FIG. 6, the system 650 includes the same components as the system 600 described above, except that the system 650 uses a different communication method between user devices 604-610, eliminating the AP device 602. Additionally, the user devices 604-610 may be modified to use the communication method, although the disclosure contemplates the user devices 604-610 being so enabled in the system 600. The system 650 uses peer-to-peer communication components and protocols to enable the user devices 604-610 to communicate with each other directly, as indicated by the arrows between the user devices 604-608. The user devices 604-610 may thus be compliant with the same peer-to-peer standard in order to use it. Further, as described above with respect to the system 600, the system 650 uses a communication protocol that prevents data packet collisions. In one implementation, the user devices 604-610 connect via Wi-Fi Direct, which uses the CSMA/CA protocol. In the system 650, each user device 604-608 that is participating in the mediation may establish a communication channel with each of the other mediating user devices 604-608, and may send its respective quality value 614-618 to each of the other mediating user devices 604-608 over the established channels. In some embodiments, the mediation then proceeds as described above. For example, the Wi-Fi Direct network may be configured so that one of the user devices 604-610 is configured as the "Group Owner," which is the only device capable of multicasting data packets. This device may function as the AP device 602 of FIG. 5, as described above. In other embodiments, each of the user devices 604-610 may be able to multicast its data packet. Thus, the first of the user devices (e.g., first user device 604) to multicast its data packet 614 to the other user devices 606, 608 will prevent the other user devices 606, 608 from transmitting their data packets, 616, 618, and will assume priority.

Figure 7:
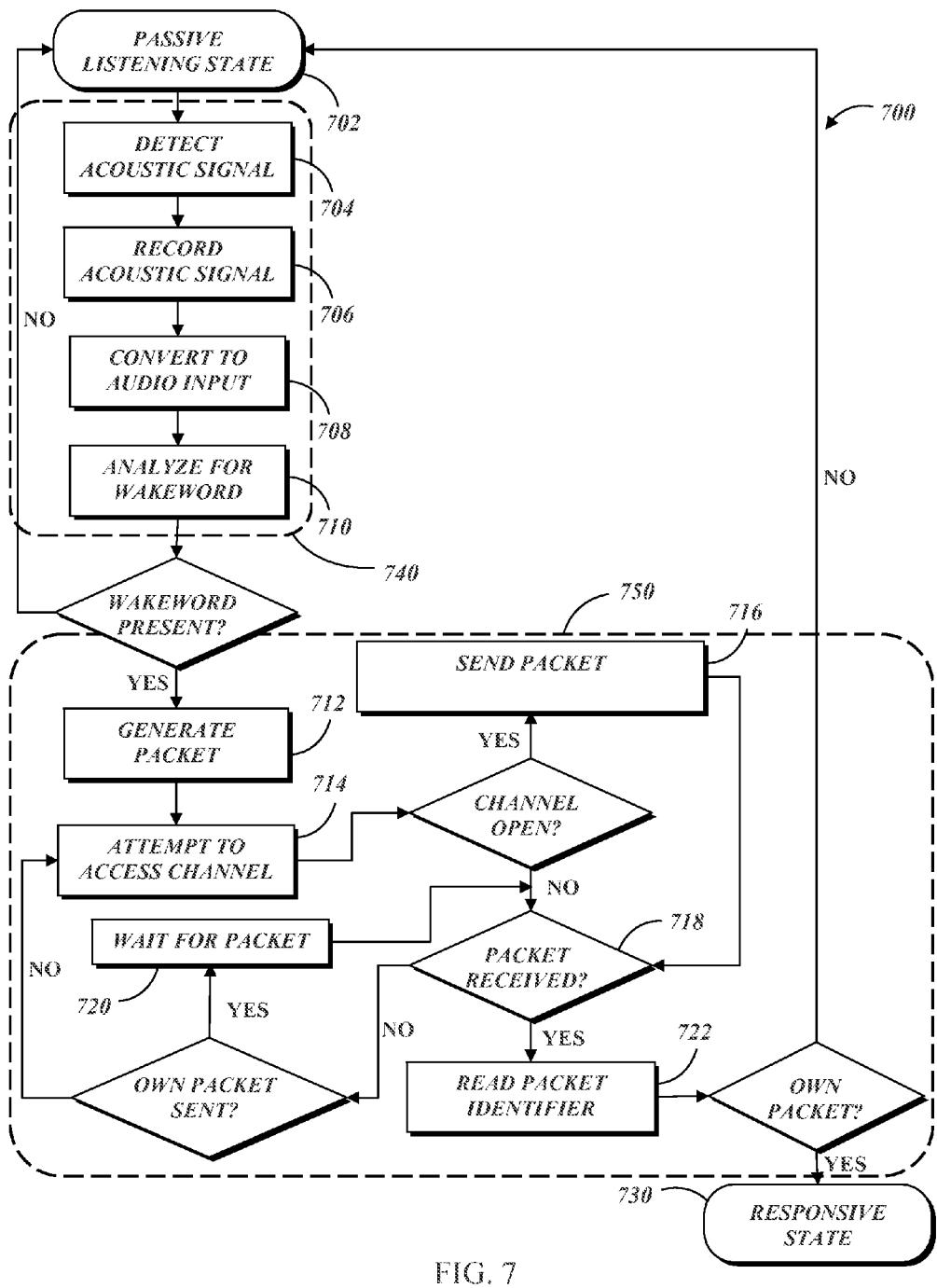
FIG. 7 is a flowchart of a method of determining response priority according to speed of packet multicasting.

FIG. 7 illustrates an exemplary method 700 performed by a computing device (e.g., the first user device 604 of FIG. 5 and the computing device 200 of FIG. 2) that is an alternative to the method 300 of FIG. 3. The passive listening state 702 and the wakeword detection state 740 are described above with respect to the passive listening state 302 and the wakeword detection state 340, respectively, of FIG. 3. Similarly, the method 700 includes detecting the acoustic signal (step 704), recording the acoustic signal (step 706), converting the recording to the audio input (step 708), and analyzing the audio input for the wakeword (step 710), all as described above with respect to steps 304-310 of FIG. 3. Then, if the wakeword is present in the audio input, the computing device may transition to a wakeword mediation state 750. At step 712, the computing device may generate a data packet, which serves as an indicator that the computing device has received the wakeword. At step 714, the computing device may attempt to access the communication channel, which uses a collision avoidance protocol as described above. If the channel is open, at step 716 the computing device may send its data packet to the receiving device.

If the channel is not open, or after the computing device sends its data packet, at step 718 the computing device determines whether it has received a data packet generated by one of the computing devices participating in the mediation. If not, and the computing device has sent its own data packet already, the computing device waits (step 720) and repeats its check for a received packet. If the computing device has not received a packet and has not sent its own packet, the computing device tries again to access the communication channel (step 714).

At step 722, once the computing device has received a data packet it reads the data packet identifier. If the data packet is the computing device's own data packet, the computing device transitions to the responsive state 730. If the data packet was generated by a remote computing device, the computing device returns to the passive listening state 702.

Figure 8:
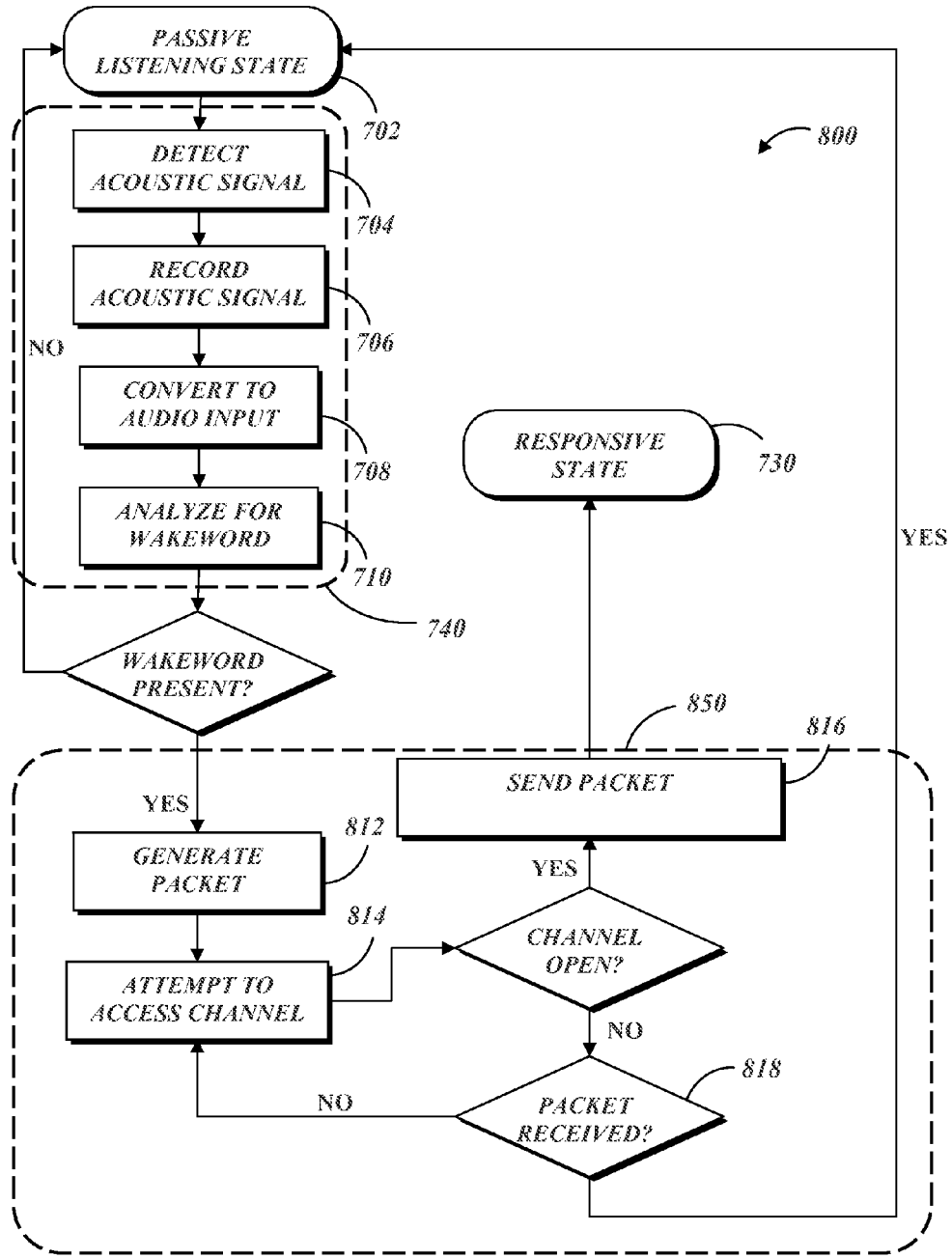
FIG. 8 is a flowchart of another method of determining response priority according to speed of packet multicasting.

FIG. 8 illustrates an alternative method 800 to the method 700 of FIG. 7. The method 800 may be implemented by the user devices 604-610 in the peer-to-peer communication environment of FIG. 6, where all of the user devices 604-610 are configured to multicast their own packets to the other user devices 604-610 in the environment by establishing a direct communication channel with each other user device 604-610, or have one of the devices in the peer-to-peer network do the multicasting for everyone else. In such an environment, a wakeword mediation state 850 of the computing device may be simplified because the computing device will assume priority if it is able to send its data packet, and will cease processing the audio input if it receives a data packet from another computing device that is participating in the wakeword mediation. Thus, the method 800 proceeds from the passive listening state 702 through the steps 704-710 (i.e., the wakeword detection state 740) of the method 700 of FIG. 7. If the wakeword is present in the audio input, at step 812 the computing device generates its data packet. The data packet may contain a minimal about of information: the computing device is communicating directly with other devices, so the data packet does not need any delivery information; and, the data packet does not need to provide any information to the receiving device, except in some embodiments the data packet may at least include an indication that it is a wakeword mediation data packet.

At step 814, the computing device may attempt to access the communication channel(s) with the other devices in the environment. The communication channel(s), such as a one-to-many connection (e.g., a Layer 2 multicast connection) or a group of one-to-one connections (e.g., a Wi-Fi Peer-to-Peer Service connection), may already exist, or the step 814 may include establishing communication channels with unconnected devices. If a communication channel for multicasting is open, or a communication channel to each of the devices is open, at step 816 the computing device may send its data packet to the other devices. Upon successfully sending its data packet, the computing device may assume priority of response to the wakeword and enter the responsive state 730. If the channel(s) is/are not open, at step 818 the computing device may determine whether it has received a wakeword mediation data packet from one of the other devices. If so, the computing device does not have priority and returns to the passive listening state 702. If not, the computing device may return to step 814 and continue attempting to access the communication channel(s) and send its data packet.

The various embodiments described herein can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

What is claimed is:

1. A computing device comprising:
   a network interface;
   a microphone;
   a processor that converts an acoustic signal received by the microphone into a first audio input; and
   memory storing program instructions, the computing device executing the program instructions to:
   determine a first signal strength value representing a first signal-to-noise ratio of the first audio input;
   determine that the first audio input comprises a wakeword;
   generate a first data packet comprising the first signal strength value;
   send the first data packet to an access point device communicatively coupled to the computing device;
   receive a second data packet from the access point device at a first time, the second data packet comprising the first signal strength value;
   receive a third data packet from the access point device at a second time, the third data packet comprising a second signal strength value representing a second signal-to-noise ratio of a second audio input, wherein the second audio input is generated from the acoustic signal by a second computing device that is configured to process the second audio input in response to detecting the wakeword included in the second audio input;
   determine that the first signal strength value is approximately equal to or greater than the second signal strength value;
   determine that the first time is prior to the second time;
   determine that the first audio input further comprises a command;
   responsive to determining that the first time is prior to the second time, perform an action associated with the command.

2. The computing device of claim 1, wherein the computing device further executes the program instructions to, after determining that the first audio input comprises the wakeword:
   determine that a predetermined time period has elapsed;
   wherein the memory stores an expected packet transmission time, and wherein the predetermined time period has a duration that is at least as long as the expected packet transmission time multiplied by a number of remote devices communicatively coupled to the access point device.

3. The computing device of claim 1, wherein the computing device further executes the program instructions to:
   receive a fourth data packet from the access point device, the fourth data packet comprising a third signal strength value representing a third signal-to-noise ratio of a third audio input, wherein the third audio input is generated from the acoustic signal by a third computing device that is configured to process the third audio input in response to detecting the wakeword included in the third audio input; and
   before determining that the first audio input comprises the command:
   determine that the first signal strength value is less than the third signal strength value;
   refrain from executing the program instructions to determine that the first audio input comprises the command; and
   refrain from executing the program instructions to perform the action.

4. A computing device, comprising:
   a processor that receives a first audio input representing an acoustic signal; and
   memory storing program instructions, the processor executing the program instructions to:
   determine that the first audio input comprises a wakeword;

send a first data packet comprising a first device identifier to an access point device communicatively coupled to the computing device;

receive, at a first time, a second data packet from the access point device, the second data packet including the first device identifier;

receive, at a second time, a third packet comprising a second device identifier, the third packet representing that a second device had obtained a second audio input representing the acoustic signal and had determined the second audio input comprises the wakeword;

determine that the second data packet includes the first device identifier;

determine that the first time precedes the second time;

determine that the first audio input further comprises a command responsive to determining that the second data packet includes the first device identifier and that the first time precedes the second time; and process the command.

5. The computing device of claim 4, wherein the processor executes the program instructions to:

maintain, for a predetermined time period after determining that the first audio input comprises the wakeword, a connection to the access point device via a communication channel; and receive at least the second data packet and the third data packet over the communication channel during the predetermined time period; and subsequent to the predetermined time period elapsing, process the command.

6. The computing device of claim 4, wherein the processor executes the program instructions to:

determine a first quality value of the first audio input;

send the first data packet comprising the first quality value to the access point device;

receive the third packet comprising a second quality value generated from the second audio input representing the acoustic signal;

determine that the first quality value is approximately equal to or greater than the second quality value; and determine that the first audio input further comprises a command responsive to determining that the first quality value is approximately equal to or greater than the second quality value.

7. The computing device of claim 6, wherein the first quality value comprises a first signal-to-noise ratio of the first audio input and the second quality value comprises a second signal-to-noise ratio of the second audio input.

8. The computing device of claim 6, wherein the first quality value comprises a first automatic gain control setting used to generate the first audio input, and the second quality value comprises a second automatic gain control setting used to generate the second audio input.

9. The computing device of claim 6, wherein the processor further executes the program instructions to:

receive a fourth data packet comprising a third quality value; and determine that the third quality value is less than the first quality value.

10. The computing device of claim 6, wherein before the computing device executes the program instructions to process the command, the computing device executes the program instructions to:

determine that the first quality value is greater than a threshold quality value.

11. A method, comprising:

identifying a wakeword in a first audio input of a computing device disposed within an audible range of an acoustic signal, the first audio input representing the acoustic signal as detected by the computing device;

determining a first quality value of the first audio input;

generating a first data packet comprising the first quality value;

sending, at a first time, the first data packet to a first remote device over a first communication channel;

receiving, at a second time, a second data packet from the remote device, the second data packet comprising a second quality value generated from a corresponding remote audio input of one or more remote audio inputs representing the acoustic signal obtained by the first remote device disposed in the audible range;

determining that the first quality value is greater than or equal to second quality value of the one or more remote quality values;

determining that the first time precedes the second time;

determining that the first audio input further comprises a command responsive to determining that the first quality value is greater than or equal to the second quality value and that that the first time precedes the second time; and processing the command.

12. The method of claim 11, wherein sending the first quality value to the first remote device comprises:

establishing a communication channel directly with the first remote device;

sending the first data packet over the communication channel to the first remote device; and receiving the second data packet from the first remote device over the communication channel.

13. The method of claim 11, wherein determining the first quality value of the first audio input comprises computing a signal-to-noise ratio of the first audio input.

14. The method of claim 11, further comprising waiting a predetermined time period after identifying the wakeword in the first audio input, during which predetermined time period the second data packet is received.

* * * * *